(12) United States Patent
Underhill et al.

(10) Patent No.: US 9,468,160 B2
(45) Date of Patent: Oct. 18, 2016

(54) METHOD AND SYSTEM FOR TRANSPLANTING LARGE TREES

(75) Inventors: Vann Underhill, Barberville, FL (US); Frank E Underhill, Jr., Barberville, FL (US); Gene Housley, Barberville, FL (US)

(73) Assignee: LTT SYSTEM, LLC, Barberville, FL (US)

( * ) Notice: Subject to any disclaimer, the term of this patent is extended or adjusted under 35 U.S.C. 154(b) by 423 days.

(21) Appl. No.: 12/893,330

(22) Filed: Sep. 29, 2010

(65) Prior Publication Data

US 2011/0073025 A1 Mar. 31, 2011

Related U.S. Application Data

(60) Provisional application No. 61/247,348, filed on Sep. 30, 2009.

(51) Int. Cl.
*A01G 23/04* (2006.01)

(52) U.S. Cl.
CPC .................. *A01G 23/046* (2013.01)

(58) Field of Classification Search
USPC ...... 37/302, 397–399, 444, 445, 450; 47/76, 47/1.01 P, 1.01 R; 111/101, 919; 171/50; 172/26.5, 26.6; 206/423; 220/4.28, 220/4.33; 254/264; 414/23
See application file for complete search history.

(56) References Cited

U.S. PATENT DOCUMENTS

| | | | | | |
|---|---|---|---|---|---|
| 1,693,353 | A | * | 11/1928 | Slavin | 172/26.6 |
| 2,341,838 | A | * | 2/1944 | Bager | 37/396 |
| 5,158,418 | A | | 10/1992 | Korenek | |
| 5,246,128 | A | * | 9/1993 | Uitz | 220/4.28 |
| 6,138,769 | A | * | 10/2000 | Breyer | 172/380 |
| 6,237,260 | B1 | * | 5/2001 | Gooch | 37/398 |

* cited by examiner

*Primary Examiner* — Christopher J Novosad
(74) *Attorney, Agent, or Firm* — James H. Beusse, Esq.; Beusse Wolter Sanks & Maire, PLLC

(57) ABSTRACT

A method for moving large trees by cutting trenches around the tree so as to define a generally rectangular root ball for the tree and positioning a box structure in an excavated area along one side of the defined root ball so that the box structure can be pulled beneath the tree to as to sever the root ball. One side of the box structure is open and has a cutting plate that can be pulled under the tree. A pulling mechanism is positioned in a second excavated area on an opposite side of the root ball and cables are attached to the box structure so that it can be pulled beneath the root ball to sever and capture the ball. The open side of the box structure is then closed and lifting devices attached to the structure to allow the tree to be lifted from the ground.

20 Claims, 7 Drawing Sheets

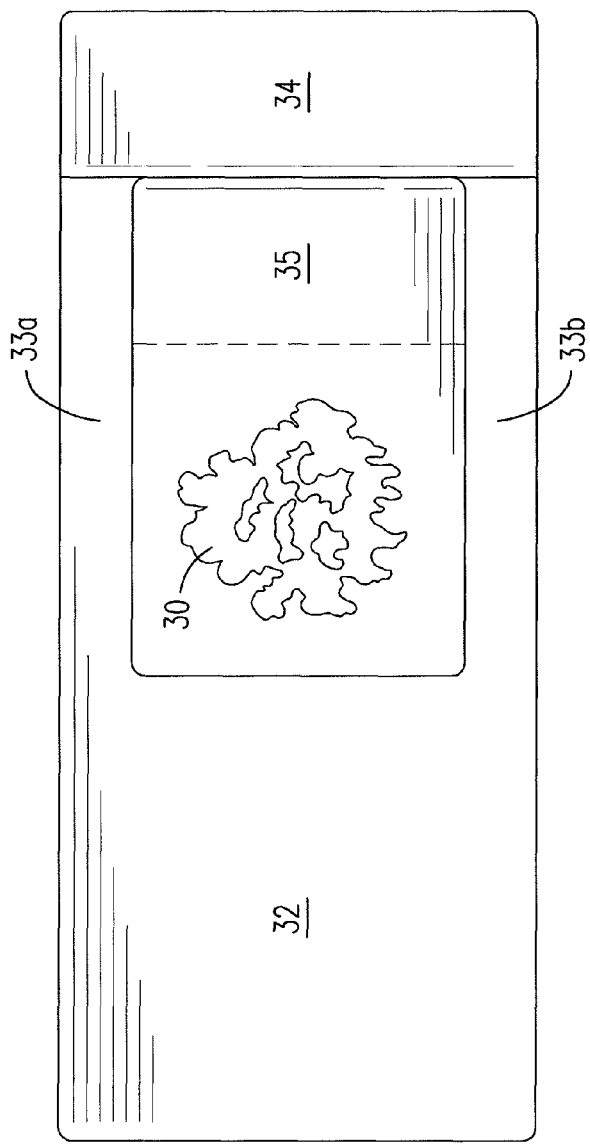
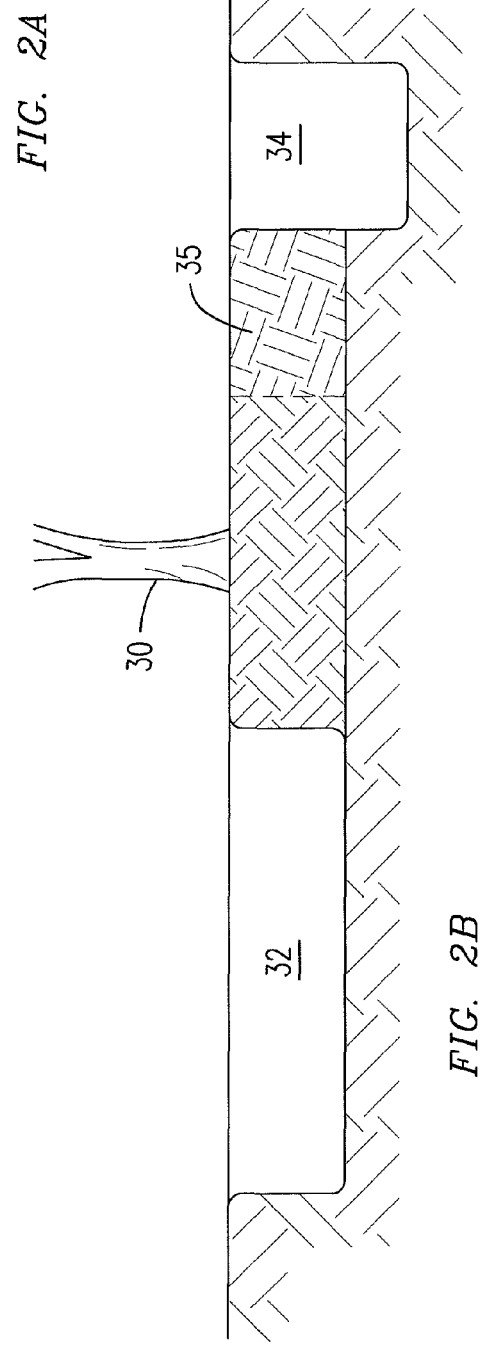
FIG. 2A
FIG. 2B

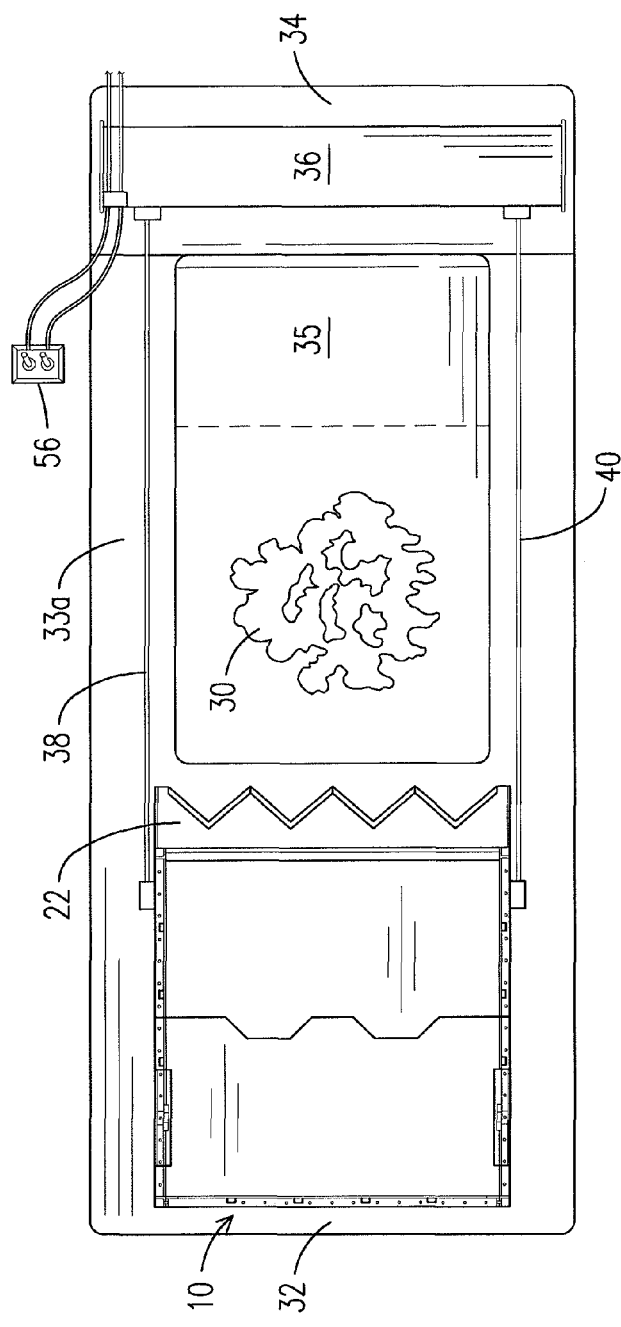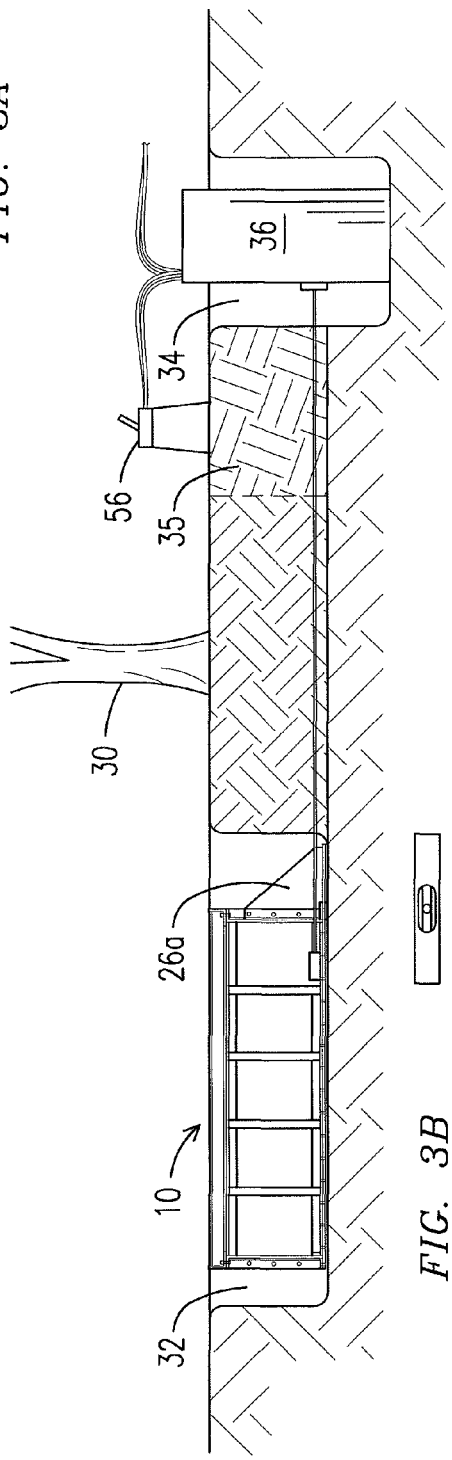

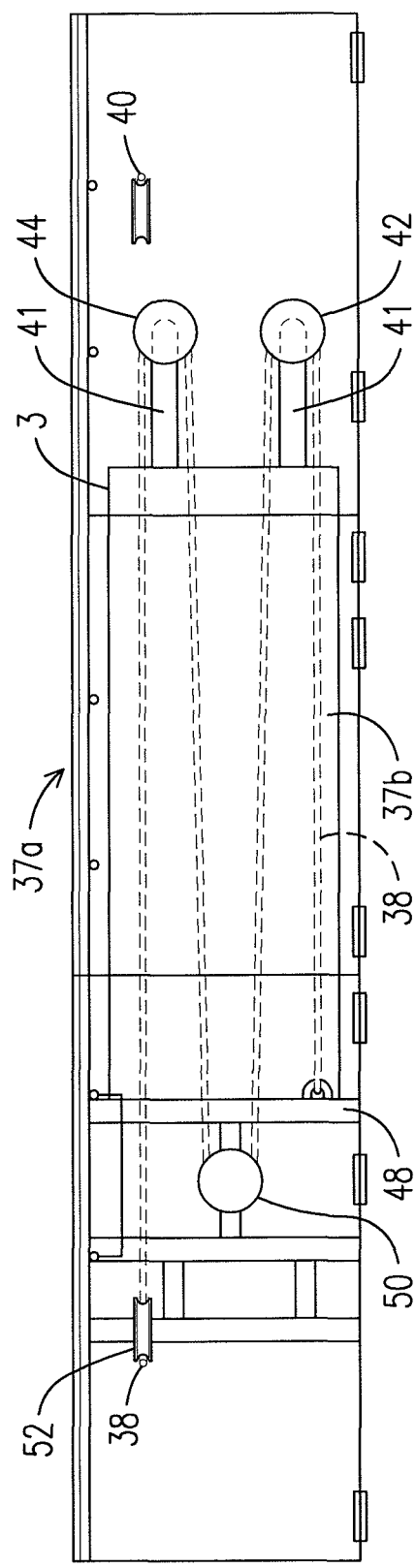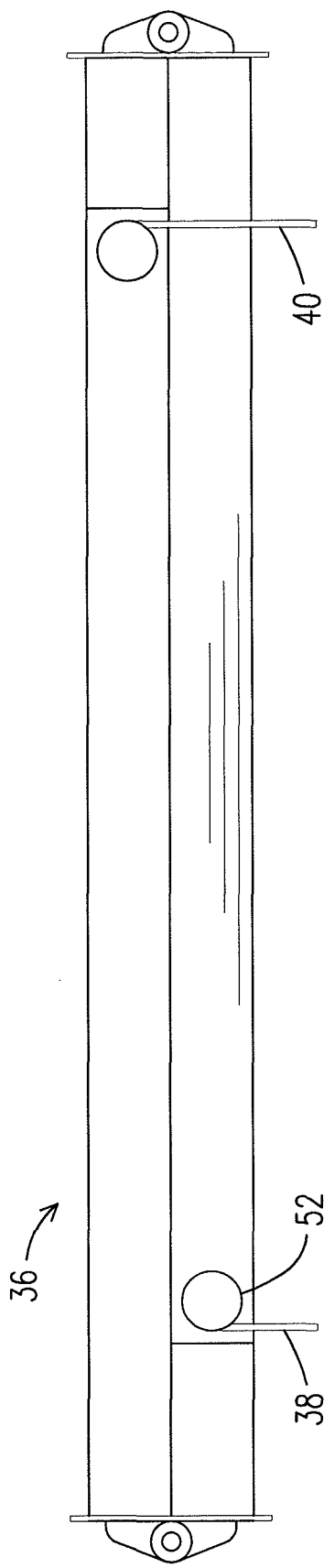
FIG. 6A
FIG. 6B

METHOD AND SYSTEM FOR TRANSPLANTING LARGE TREES

CROSS-REFERENCE TO RELATED APPLICATION

This application claims priority of U.S. Provisional Patent Application No. 61/247,348 filed Sep. 30, 2009, which is incorporated herein by reference.

BACKGROUND OF THE INVENTION

The present invention relates to tree transplanting systems and, more particularly, to a method and system for transporting and transplanting large trees.

Large trees such as oaks having trunk or bole diameters in the range of 14 inches and larger are not generally transplantable due to the size of the root ball and the canopy of the tree. As used herein, bole diameter refers to the average diameter of a tree at or just above ground level. There are demands for such large trees at various commercial facilities such as theme parks where time is of the essence in developing a park and the developers cannot wait years for trees to grow to reasonable size. It is also desirable to be able to move very large trees on property in order to facilitate construction and then to be able to re-plant such trees at a later time in the same or a different location. One prior system for moving trees is described in U.S. Pat. No. 5,158,418. The system of the '418 patent requires that the root ball be defined by a set of angularly trenches into which form walls can be inserted and fastened together so as to create an inverted truncated pyramid enclosing the root ball. Thereafter, an augur is used to undercut the root ball in sections to allow a plurality of planks to be sequentially inserted under the root ball and fastened to the side walls of the form.

It is believed that the system of the '418 patent has a number of deficiencies. One of these is the difficulty of digging a sloping sidewall around the tree for receiving the form sections. Another is that the angular trenches reduce the size of the root ball and risk damage to the tree. Still another is that the use of an auger to undercut the root ball is cumbersome and difficult to control, particularly if the auger impacts a tap root or other large root under the tree.

The present invention provides a simpler, safer and more efficient system of digging and holding a large root ball for large trees that overcomes many of the problems of the prior art. After much experimentation, applicants have found that oak trees having bole diameters in the range of 14 to 30 inches can be safely moved if the root ball is at least about 10 feet square and about 40 inches in depth. The method and apparatus of the present invention is useful in transplanting a tree of such a larger diameter and at a depth of 40 inches or more. With regard to oak trees, it is believe that the largest highway transportable tree may be limited to ones having a bole diameter of about 30 inches since that size tree will have a weight that approaches DOT weight limits for highway transport. In instances where the tree is being moved without highway transport, larger trees may be dug and transplanted using the teaching of the present invention.

SUMMARY OF THE INVENTION

The present invention comprises a method and apparatus for moving a very large tree without damaging the tree. The method can be used to excavate a tree and to put the tree into temporary storage for extended periods. It is believed that a tree excavated using the teaching of the present invention can be stored up to two years before being transplanted. Such storage is of benefit in land development since the large trees can be excavated and saved while construction is occurring. Thereafter the trees can be returned to the property and transplanted in any desired location. The method of the present invention is implemented by cutting a first and a second trench along two opposite sides of a tree at a predetermined depth and distance from the bole of the tree thereby severing roots of the tree at the trenches. Preferably, the roots are severed at a location at least about five feet from the center of the tree bole and the trenches are cut down to a depth of about 40 inches. After a period of time to allow the tree to recover from the shock of root severing, a third and a fourth trench each generally perpendicular to and intersecting the first and second trenches are cut on opposite sides of the tree so as to define a generally square root ball for the tree. The tree is then allowed a rest period to recover from the cutting of the second pair of trenches. Ideally, each of the rest periods after cutting of the trenches is at least about 60 days but applicants have found that shorter rest periods in the order of about 30 days are sufficient in some instances. It may also be advisable with larger trees to cut the trenches one at a time with a rest period for the tree between each trench cutting. In general, a smaller bole diameter such as 14 inches requires less time between root pruning and excavation while larger tree require more time. The time for recover also varies for different sizes of root ball. The exemplary 10 foot by 10 foot root ball is selected in order to facilitate transport on a flatbed tractor-trailer over DOT controlled highways. It is also noted that recovery time from trenching is related to seasons and is less during the winter season when the tree is somewhat dormant.

After allowing the tree to recover from the root cutting by trenching, preparation for the tree excavation requires creating a first excavated area along one side of the tree extending outwardly from the first trench away from the tree, to form a first excavated area having a size larger than the size of the area defined by the trenches surrounding the tree and having a depth at least the depth of the trenches. A metal box structure is then positioned in the first excavated area. The box structure has a bottom plate and at least three vertically extending side members attached to each of three respective peripheral edges of the bottom plate. The fourth edge of the bottom plate faces the tree and abuts the first trench. A metal cutting blade is attached to the fourth edge of the plate and lies in a plane of the bottom plate so that the plate can be advanced toward the tree with the cutting edge severing any roots protruding downward below the 40 inch threshold of the root ball. A second excavated area is formed on a side of the tree opposite the first excavated area, the second excavated area being sized to accept a pulling mechanism having a pair of cable attachments for connection to the box structure. The cable attachments are connected to the box structure through the pair of trenches oriented perpendicular to the first and second trenches and actuated pull the box structure under the tree without additional excavation such that the cutting edge severs the roots under the tree and the box structure encompasses the root ball of the tree defined by the trenches. Once the plate has passed fully under the tree such that the cutting blade has entered into the second excavated area, the pulling mechanism is disconnected and removed from the area so that a fourth side of the box structure can be attached to the base plate and to the adjacent sides of the box structure. Bracing is then attached across the root ball connecting the opposite sides of the box structure so that a crane or other lifting device can be connected to the box structure for lifting the tree and the box structure for transport to another location.

If the tree is to be placed in long term storage before being transplanted, the metal sides of the box structure may be removed and replaced with a wooden frame supported conventional root block nursery cloth. This allows normal irrigation of the tree and minimizes overheating of the root ball that could occur in a sealed environment created by the metal box structure and also maintains dimensions and shape of the root ball allowing the steel side plates and lifting apparatus to be reattached when required for lifting and transporting the tree for transplant. It is also noted that in situations where the tree is to be maintained on the property from which it is excavated so that transportation over a highway is not required, the root ball can be made larger such as, for example, 20 foot by 20 foot, and thereby minimize stress on the tree by pruning at a greater distance from the bole. In some instances, it may be possible to excavate a tree using such greater size root ball without root pruning in advance.

BRIEF DESCRIPTION OF THE DRAWINGS

FIGS. 2A and 2B are a plan view and an elevation view illustrating preparation of a tree for excavation;

FIGS. 3A and 3B are plan and elevation views of FIGS. 2A and 2B with the box structure and structure pulling mechanism in place preparatory to separating the tree root ball from ground;

FIGS. 6A and 6B are elevation and plan views of one form of pulling mechanism that may be used to advance the box structure under the tree root ball;

DETAILED DESCRIPTION OF A PREFERRED EMBODIMENT

Figure 1A:
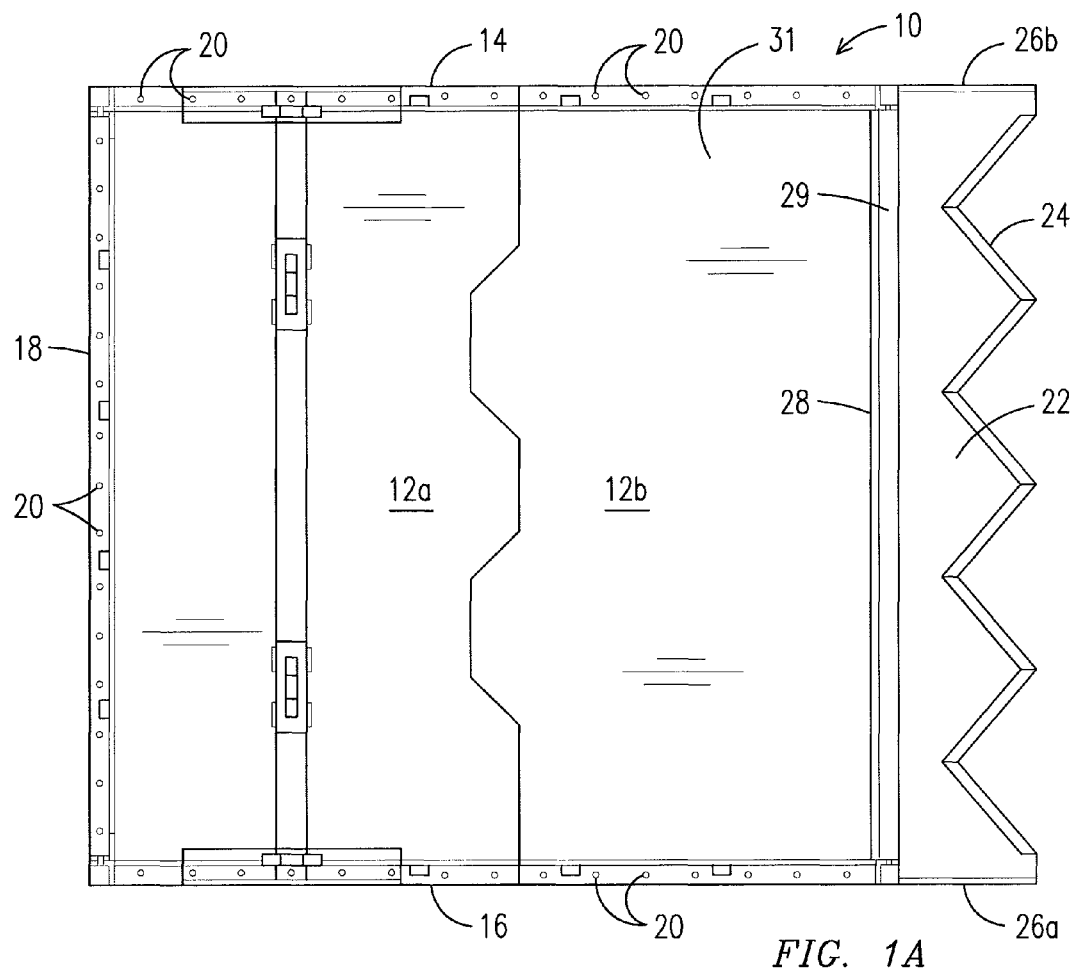
FIG. 1A is a top plan view of an illustrative form of box structure for use in the method and apparatus of the present invention for excavating a large tree.
Figure 1B:
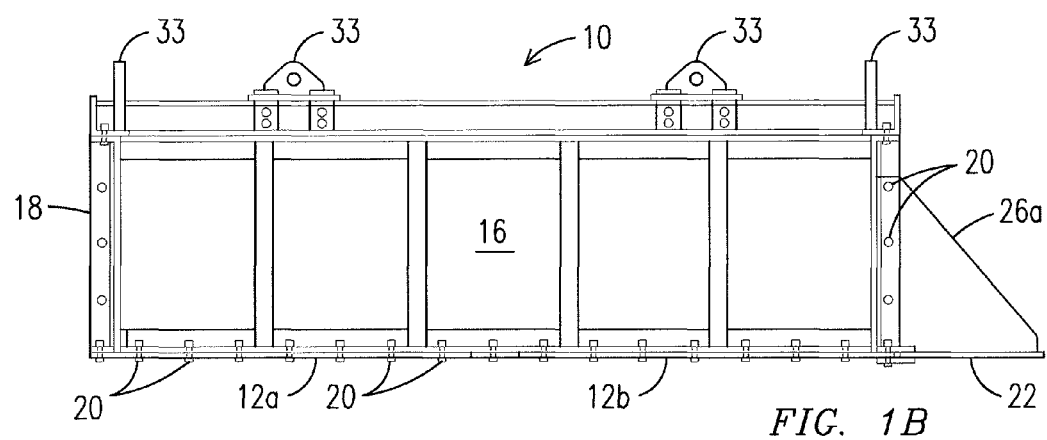
FIG. 1B is a side elevation view of the structure of FIG. 1A.

The system of the present invention uses a box-shaped steel structure having three closed sides and a bottom to rapidly excavate a large tree. The term "box-shaped" as used herein refers to a final configuration of a preferred form of the structure for enclosing the root ball of a tree being excavated and while shown as generally square, could take on other configurations. The structure comprises a bottom plate, which may be formed from one, two or more steel plates, bolted to three vertical steel members or side plates forming an open-sided box. The bottom plate is the primary structural member of the box structure and also incorporates the blade for undercutting a tree root ball. In one exemplary embodiment, the bottom plate is formed of two mating plates of 1 inch thick steel sheet each measuring somewhat larger than about five feet by ten feet in order to define about an 10 foot by 10 foot box (inside dimension) when the side plates are installed on the bottom plate. The side plates are preferably ¾ inch steel sheet with reinforcing members. FIGS. 1A and 1B are a top plan view and an elevation view, respectively, showing one form of structure 10 having a bottom plate 12 comprising two separable plates 12a and 12b. The bottom plate 12 is bolted to side plates 14, 16 and to back side plate 18 by bolts indicated at 20. At the open side of the structure 10 there is attached a cutting blade 22 that preferably is formed with a serrated cutting edge 24. The serrated cutting has a pitch of about 30 inches and operates to create a slicing action on the tree roots as the box structure is advanced under the tree root ball. The cutting blade is attached to the structure by triangular braces 26a and 26b at opposite ends thereof. Further, the interface between the blade 22 and bottom plate 12 includes a tongue and groove type connection so that the trailing edge 28 of the blade has a portion 29 that extends over the upper surface 31 of the bottom plate. This assures that the blade and bottom plate function as a unitary member when the structure is used to cut beneath a root ball of a tree. The side plates of the structure 10 include lifting lugs 33 at all four corners of the structure. In a preferred embodiment, the side plates include three lifting lugs at each corner that are spaced to allow different positions of lifting cables when the tree is lifted so as to minimize obstruction of the cables by the tree canopy and damage to limbs of the tree contacting the cables.

The following description of the system and method of the present invention assumes that the steel structure of FIG. 1 is selected to have a 10 foot by 10 foot footprint and is about 40 inches high at the sides. This size structure has been found adequate to transplant trees up to 14 to 24 inches in bole diameter and is believed to be adequate to safely transplant trees having a bole diameter up to 30 inches. Obviously, other sizes structures could be utilized for larger trees.

Preparation of a tree for transplant requires advance planning since such large trees have extensive root patterns that need to be pruned back to a size such as the 10 by 10 foot size of the structure 10. One method of pruning such roots is to trench along two opposite faces of a tree at a distance of 5 feet from the tree several months prior to the date of transplant. This allows the tree to recover from the shock of pruning before being transplanted. At a later time, which could be as short as 30 days for a 14 inch tree or several months for a 30 inch tree, a second pair of trenches can be cut along the remaining two faces of the tree so that the root ball is now defined within a 10×10 foot square. Once adequate time has been allowed for the tree to recover from the pruning, the tree is ready for transplant. Recent experimentation with oak trees has shown that short pruning cycles of 30 to 60 days are possible for trees up to about 24 inches without loss of viability of such trees even with a 10 foot square root ball.

Initial preparation for transplant of the tree requires excavation of an area adjacent the tree for positioning of the structure 10. While the sides of the structure 10 are about 10 feet in length, the cutting blade 22 adds about two feet to the length of the structure so that at least a 10×12 foot space is required to position the structure. However, because access to sides of the structure is needed during positioning, it is desirable to excavate an area adjacent the tree that provides about two to three feet of open space around the structure 10. The depth of the excavated area should be such as to position the top of the structure 10 at ground level. In a preferred embodiment for transplant of oak trees, this depth is at least about 40 inches.

It will be noted by reference to FIGS. 2-5 that the basic concept of excavating the tree involves positioning of the structure 10 and then pulling the structure towards the tree such that the blade 22 passes under the tree severing any downwardly extending roots and allowing the structure to be positioned with the bottom plate 12 under the tree. The blade 22 is then removed and a final fourth side of the structure installed to form the box to contain the root ball of the tree. Thereafter, plates, such as plywood sheets, are positioned on top of the root ball (at ground level) and a fixture attached to the four sides of the structure to stabilize the sides and to hold the top plates firmly against the root ball. This keeps the root ball in compression and prevents separation of the roots from the surrounding earth during handling of the tree. In practice, shims (not shown) are driven between the plywood sheets and the fixture in order to further compress the root ball into the box structure to prevent movement or shifting of the root ball during handling. This is of particular importance when the tree is to be loaded onto a trailer and tilted at an angle or laid on a side for transport.

Turning now to the top plan view and side cross-sectional view of FIGS. 2a and 2b, respectively, there is shown a general plan for excavating around a tree 30 in preparation for removing the tree for transplanting. Typically, a mechanized excavator such as a back hoe is used to dig a box area 32 that is about 14 ft.×14 ft.×40 inches deep on one side of the trenched 10 ft.×10 ft. root pruned tree 30. The bottom of the box area 32 has to be substantially level to the desired bottom of the oak's root ball so that the box structure 10 can be advanced under the root ball without trending either upward or downward. On the opposite side of the tree from the box area 32 there is another excavated area 34 for receiving the mechanism for pulling the structure 10 under the tree. The box area 32 and area 34 are connected by trenches 33a, 33b of about 2 ft. width along each side of the oak's root ball. Each trench 33 follows along an outside edge of the previously cut trench used to sever the tree roots. The trenches 33 provide a path for a pair of cables that connect the pulling mechanism to the box structure 10 and also provide a path for the side plates 14, 16 as the box structure 10 is pulled under the root ball of the tree. In the illustrated embodiment, the pulling mechanism 36, shown in FIGS. 6A and 6B, comprises a horizontal arrangement of multiple hydraulic cylinders or rams mounted in a housing having a length of about 16 feet, a height of about 40 inches and a depth of about 3 feet. To accommodate this mechanism, the area 34 is about 18 ft. wide by 54" deep and 4 feet long. Since the mechanism 36 is braced against the tree root and also because the structure 10 must be pulled completely through the root ball to allow the leading cutting blade 22 to be removed and replaced by a box closing final side wall, the excavated area 34 is dug several feet outside of the adjacent root cutting trench. This arrangement creates an extra area of unexcavated ground area 35 between the tree root ball and the area 34. This extra area 35 acts as a buffer between the root ball and the pulling mechanism to reduce compression of the root ball during the pulling process while also providing an area for access to the blade 22 to enable it to be removed and the final side of the structure 10 attached thereto.

Referring to FIGS. 6a and 6b, one form of pulling mechanism 36 that may be used with the present invention is illustrated schematically. This mechanism comprises two sets of double hydraulic rams, one set of hydraulic rams 37a and 37b controlling a cable 38 to be connected to one side of the structure 10 and another set of hydraulic rams (not shown) controlling a second cable 40 to be connected to another side of the structure 10. Each cable 38, 40 is independently controllable to enable the structure 10 to be pulled in a straight line towards the mechanism 36. The rams 37a, 37b are mounted in a shell forming the outer structure for the mechanism 36. Each ram is fixed at one end of the mechanism while the extending, moveable piston rods 41 are each attached to respective pulleys 42, 44. One end of the cable 38 is fixed to the same brace 48 as the rams and extends over pulley 42, back to a fixed pulley 50 and then over the moveable pulley 44. The cable 38 is routed back about a pulley 52 and then directed out of the mechanism. The advantage of this arrangement is that each ram movement results in twice the amount of movement of the cable. With two rams being used, movement of four feet of both piston rods results in sixteen feet of movement of the cable. The second cable uses a duplicate arrangement of rams. In the illustrative embodiment, each ram is rated at 50,000 pounds. This particular arrangement of rams and cables provides the necessary power to pull the box structure 10 under the root ball of the tree 30 without having to dig under the tree and has sufficient capacity to enable the cutting blade 22 of the structure 10 to cut through any roots that are extending downward below the 40 inch desired thickness of the root ball.

FIGS. 3a and 3b are plan and elevation views respectively with the structure 10 and pulling mechanism 36 in position for advancing the box structure under the tree 30. The mechanism 36 is positioned in the excavated area 34 and the cables 38, 40 are extended and connected to structure 10 now positioned in excavated area 32. A control unit 56 is connected to mechanism 36 and to a source of pressurized hydraulic fluid (not shown). The control unit is simply a pair of joystick type controls in the hydraulic fluid supply lines that allow an operator to control the fluid supply to each of the set of hydraulic rams, such as rams 36. The control unit 56 is preferably portable to allow it to be positioned so that the operator can observe the advance of the structure 10 and adjust the ram operation so as to keep the structure advancing in a straight line until it reaches the position shown in FIGS. 4a and 4b. In this position, the cables 38, 40 can be released and the pulling mechanism 36 lifted out of the area 34. Conventional mechanized cranes (not shown) are typically used to move the mechanism 36 as well as the box structure 10 and also to lift the excavated tree onto a flatbed truck or other suitable transport device. Although not shown, it is a feature of the invention that the box structure 10 could be constructed in sections that could be pulled under the root ball partially, another section added and the process repeated as necessary to create a boxed root ball of a desired dimension. The advantage of using a sectioned structure is that it would reduce the size of the excavation and the initial size of the structure to permit use in tight urban environments.

Figure 4A:
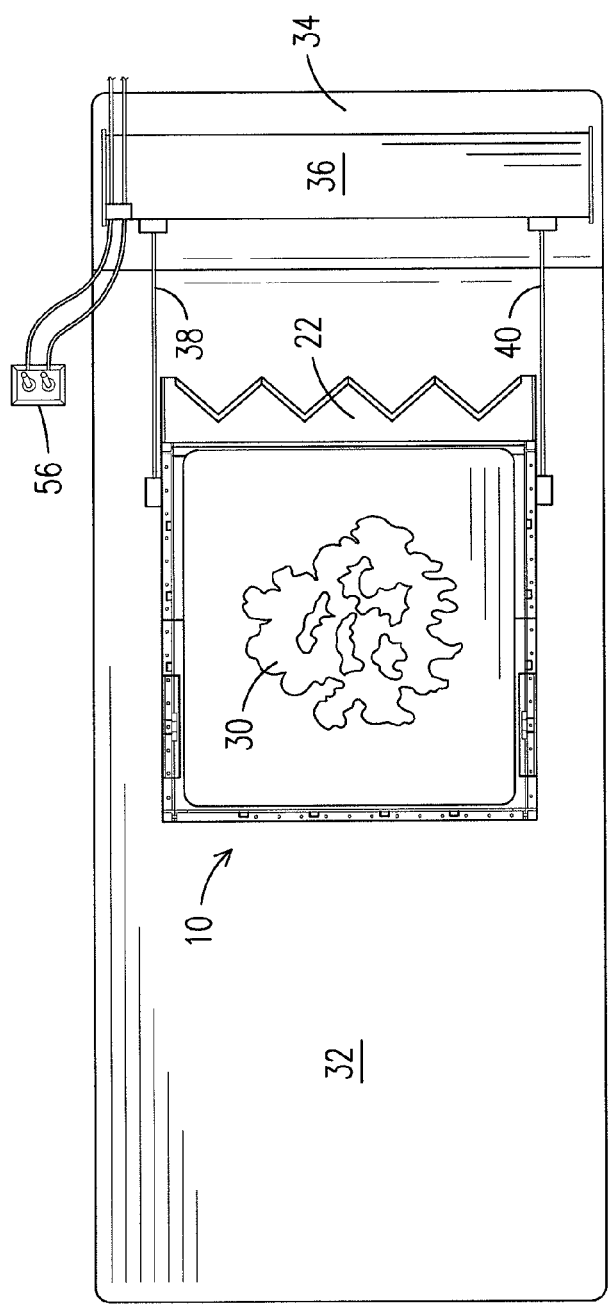
FIGS. 4A and 4B are plan and elevation views of FIGS. 2A and 2B with the box structure advanced under the tree root ball.
Figure 4B:
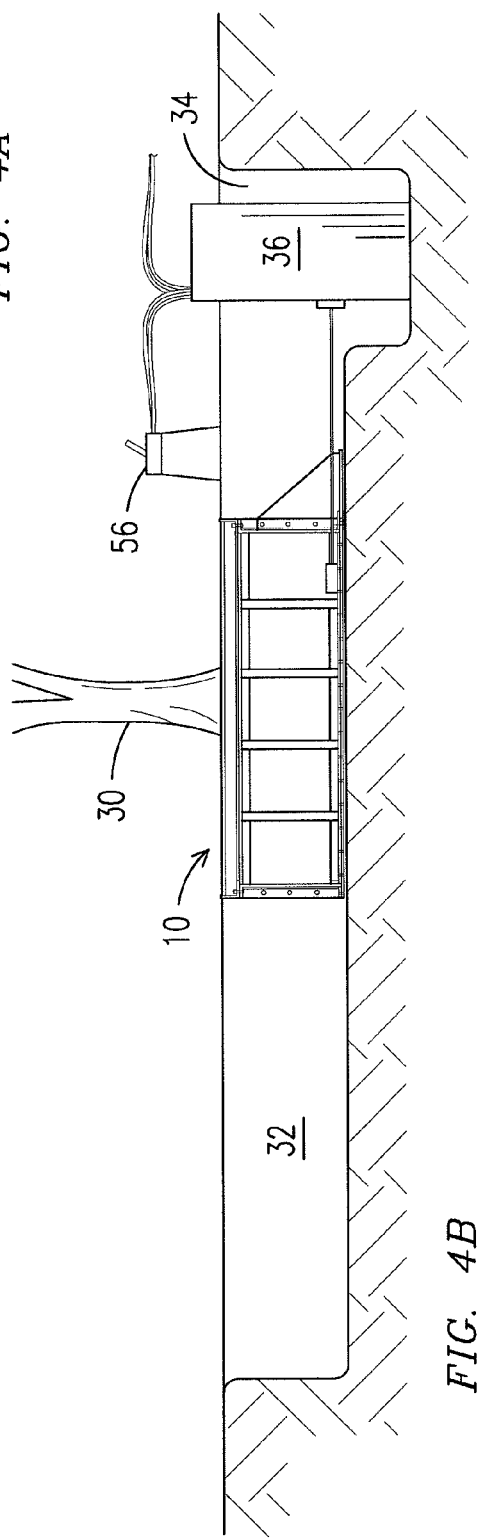
Figure 5A:
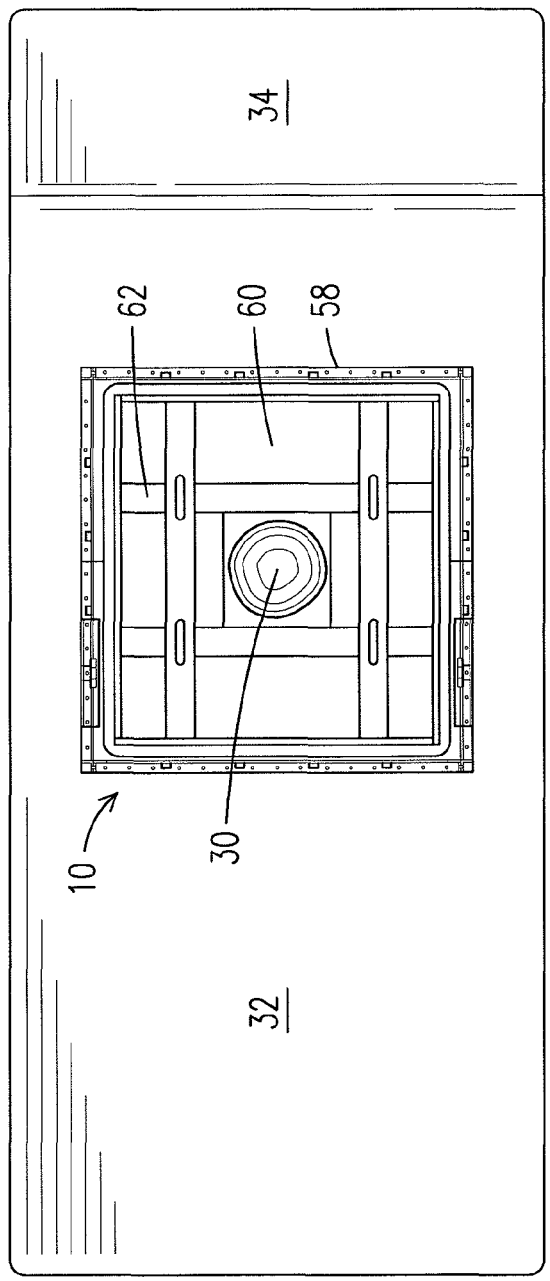
FIGS. 5A and 5B are plan and elevation views of the tree root ball of FIGS. 2A and 2B with the box structure fully closed and top bracing in position for lifting of the tree.
Figure 5B:
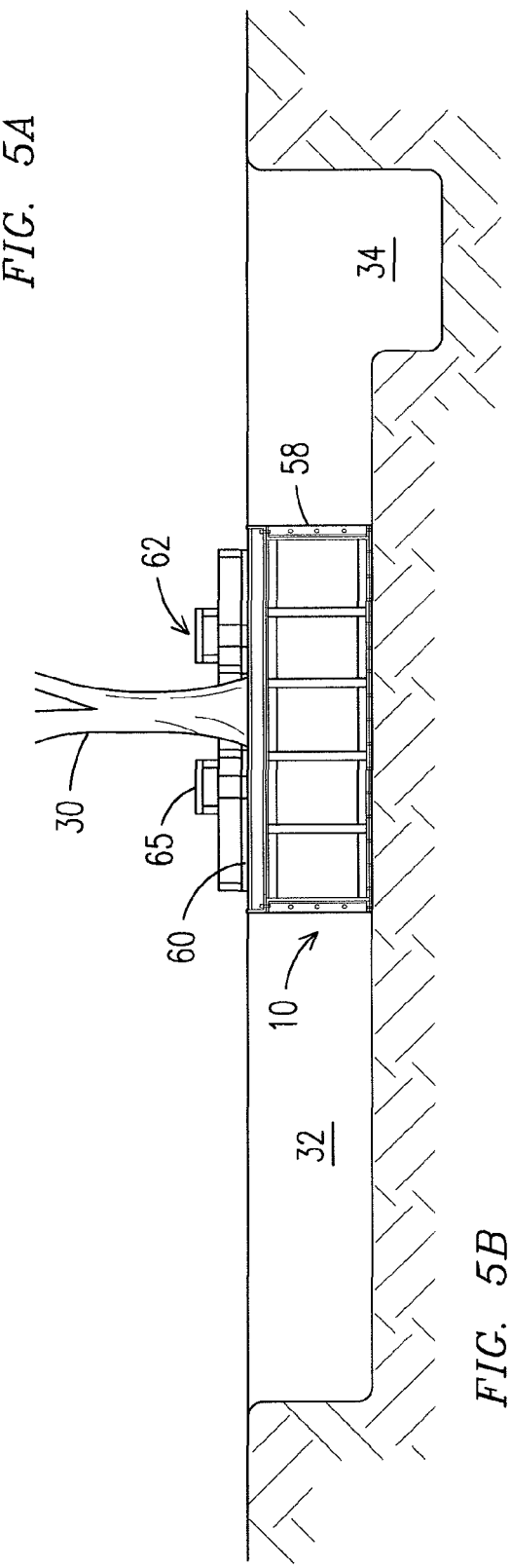

Once the box structure 10 is in the final position as shown in FIG. 4a, the extra earth in the area 35 adjacent the open end of the structure 10 is removed, the cutting blade 22 disconnected and removed and the final or fourth side member 58 is attached to the structure. The area 35 can be cleared by a combination of back hoe and shovel so as to avoid damage to the cutting blade 22. As seen in FIGS. 5a and 5b, with the structure completely enclosing the root ball, plywood sheets 60 are placed on top of the root ball and a clamping fixture 62 attached by bolts to the four sides of the box structure 10. The fixture 62 is designed hold the four sides securely in position while also pressing against the plywood sheets to further compress the root into the structure 10. The fixture 62 comprises multiple beams and cross-beams indicated at A, B and C. Element D in FIG. 5b are cross pieces on straps that may be used to lift the tree.

A plurality of lifting eyes 63 are incorporated into the fixture 62 for connection of conventional hooks and cables for lifting the tree and root ball for transport.

As will be recognized, heavy equipment is needed to handle the weight of trees of the size to be transplanted using the present invention and method. When removing the tree from the ground, the equipment is desirably connected to the structure 10 and fixture 62 in such a manner as to allow the tree to be suspended at an angle to facilitate loading and positioning on a flatbed trailer. Additionally, straps (not shown) are wrapped about the tree at some height above the root ball and then tied off to the lifting lugs 33 to further stabilize the tree with respect to the root ball. For unloading, the tree can be lifted in a similar manner and then moved into an upright position. Thereafter, it is preferred to use a large crane with cables passing through the canopy of the tree to lift it in a vertical orientation to facilitate positioning in a new location. It is also desirable to tie the limbs of the tree during transport to minimize damage and covering with a tarpaulin is recommended and may be required in some localities. Of course, if the tree is to be moved into long term storage, the tree can be placed in a storage area, the sides of the box structure 10 removed from the base plate 12 and conventional nursery root prune cloth placed around the root ball. The root ball is preferably then supported by a wood framework (not shown) built around the ball and strapped in place using conventional strapping. The root prune cloth allows the tree to be watered and fertilized while supporting the root ball.

Figure 7A:
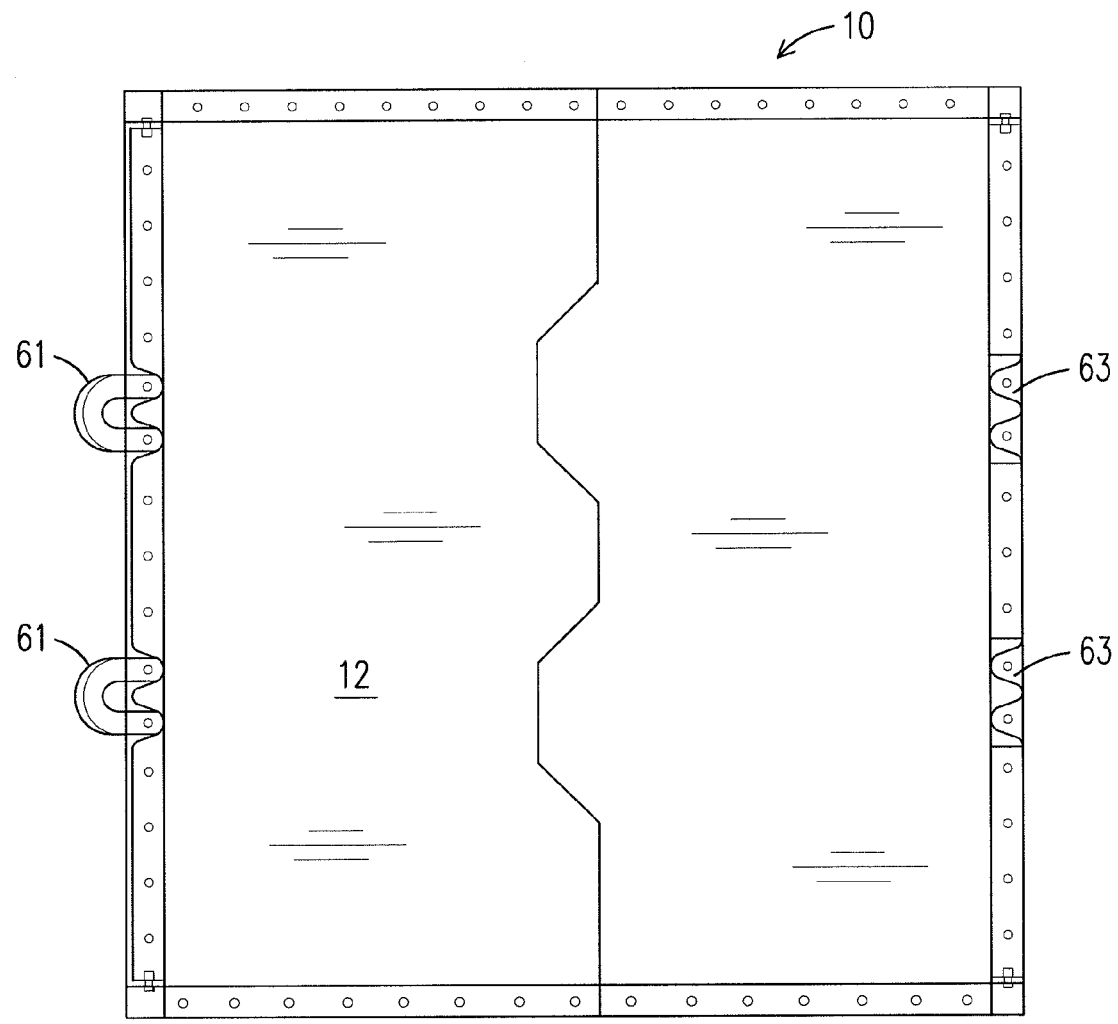
FIGS. 7A and 7B are plan and elevation views of one form of box structure that may be used in the practice of the present invention.
Figure 7B:
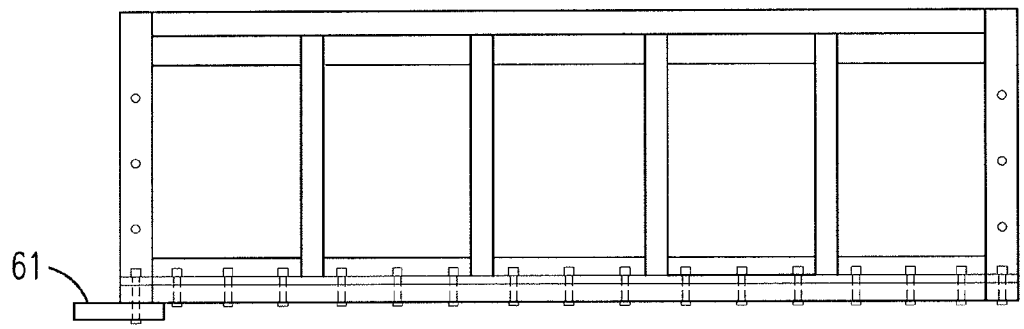

When the tree is positioned in a final location, it is necessary to prepare a planting hole that is substantially larger than the size of the box structure 10, except that the depth of the hole should be about the same or slightly less than the 40 inch depth of the structure 10. The larger hole is desirable to allow the tree to be rotated in place to a desired orientation. In addition, a larger hole is necessary in order to remove the box structure 10 from the tree once it is placed in position. In using the structure 10 as described herein, a preferred size of hole is 24 feet by 15 feet. The tree is located in the hole with enough room on at least one side to remove bottom plates 12 by pulling the plates from beneath the tree. The preferred size of the hole is also large enough to allow access to all of the bottom bolts connecting the side plates 14, 16, 18 and 58 to be removed from the bottom plates 12. It is possible to remove the side plates and brace assembly 62 by simply unbolting them and using a backhoe, front end loader or forklift truck to lift them from the hole. In that event, chains or cables are then attached to the bottom plates 12 by clamps or other suitable means so as to allow the plates to be pulled or slid from under the root ball. FIGS. 7A and 7B show one method of connecting to the bottom plate using U-shaped members 61 that are fastened to the edges of the plate. The plate is provided with connection points 63 for bolting the U-shaped members in place on either side of the plate. If necessary, the tree may be lifted slightly to reduce weight on the bottom plates. Pulling the plates 12 may be by means of a mobile construction equipment (tractor or the like) or by use of a hydraulic ram braced against a side of the root ball. Removing the bottom plates is preferably done slowly to prevent soil from being pulled from beneath the root ball causing air pockets to form. Since the disclosed embodiment uses two bottom plates 12a and 12b, the pulling process is used separately on each plate. If desired, the bottom plates 12 can be provided with threaded apertures for receiving eyebolts that can be used to pull the plates from beneath the structure or permanent hooks could be welded to the plates. In a preferred method, the side plates 14, 16, 18 and 58 are unbolted from the bottom plates 12 and the plates 12 pulled from beneath the root ball while the ball is still constrained by the side plates. In this method, in may be desirable lift the side plates slightly to place shims between the bottom plates 12 and the side plates to relieve friction as the bottom plates are pulled free. Preferably, the bottom plates 12 are removed by using a hydraulic cylinder acting against one side plate of the structure with a chain attached to the bottom plate. Once the bottom plates 12 are removed, the side bolts holding the side plates of the structure together can then be removed and each of the side plates removed from the hole. The hole is then backfilled with soil and water added to the tree. All of the pieces of the structure are heavy steel beams and plates and are saved to be re-assembled to move another tree.

What has been described is a method and apparatus for transplanting of trees having trunk or bole diameters in the range of about 14 to 30 inches, a size that is too large for conventional spade type tree excavation systems. Further, the described method and apparatus can be used to store such trees for extended periods such as, for example, up to two years or more before having to re-plant the tree.

What is claimed is:

1. A method for moving trees comprising:
    cutting a first and a second trench along two opposite sides of a tree at a predetermined depth and distance from the bole of the tree thereby severing roots of the tree at the trenches;
    waiting a period of time for the tree to recover from the shock of root severing and thereafter cutting a third and a fourth trench each generally perpendicular to and intersecting the first and second trenches on opposite sides of the tree so as to define a generally square root ball for the tree;
    waiting an additional period of time for the tree to recover from the cutting of the second pair of trenches;
    creating a first excavated area along one side of the tree extending outwardly from a first trench along that side of the tree, the first excavated area having a size larger than the size of the area defined by the trenches surrounding the tree and having a depth at least the depth of the trenches;
    positioning a box structure in the first excavated area, the box structure having a bottom plate and at least three vertically extending side members attached to peripheral edges of the bottom plate, the peripheral edge of the bottom plate abutting the first trench having a cutting blade without a side member;
    creating a second excavated area on a side of the tree opposite the first excavated area, the second excavated area being sized to accept a pulling mechanism having a pair of cable attachments for connection to the box structure;
    positioning the pulling mechanism in the second excavated area and connecting the cable attachments to the box structure through the pair of trenches oriented perpendicular to the first and second trenches;
    actuating the pulling mechanism to pull the box structure under the tree without additional excavation such that the cutting blade severs the roots under the tree and the box structure encompasses the root ball of the tree defined by the trenches;
    fastening a fourth side of the box structure to the base plate and to the adjacent sides of the box structure;
    connecting a lifting device to the box structure and raising the box structure along with the tree for transport to another location.

2. The method of claim 1 and including the step of fastening a top cover over the box structure around the bole of the tree so as to prevent soil from escaping from the tree ball.

3. The method of claim 2 and including the step of fastening a support structure to the top sides of the box structure for attaching a lifting mechanism.

4. The method of claim 3 and including the step of removing the cutting blade from the open end of the box structure prior to attaching the fourth side of the box structure.

5. The method of claim 4 and including the step of forming an extended buffer area between the tree root ball and the pulling mechanism at least as large as the length of the cutting blade.

6. The method of claim 5 and including the steps of removing the buffer area after positioning of the box structure under the tree root ball so as to provide access to the cutting blade.

7. The method of claim 6 wherein the fourth side of the box structure is attached to the structure after removal of the cutting blade.

8. The method of claim 1 and including the steps of removing the side walls of the box structure, covering the exposed sides of the root ball with nursery cloth and supporting the nursery cloth and exposed root ball sides with a wooden framework for storage of the tree prior to transplanting.

9. The method of claim 1 wherein each of the trenches is cut at least about five feet from a center axis of the tree bole.

10. The method of claim 9 wherein each of the trenches is cut to at least a depth of about 40 inches.

11. The method of claim 1 wherein the box structure is used to transport the tree to a new location and transplanting comprises the steps of:
preparing an excavated area to receive the tree by digging an area of about 40 inches deep and having dimensions substantially larger than the area of the box structure so that the tree can be rotated in position to a desired orientation;
extending the size of the excavated area in at least one direction an amount to allow the bottom plate of the box structure to be removed from beneath the tree root ball;
releasing the side plates of the box structure from the bottom plate;
attaching a mechanized pulling apparatus to the bottom plate and sliding the bottom plate from under the root ball;
removing the bottom plate from the excavated area;
uncoupling the side plates from each other and removing the side plates from the excavated area; and
back filling the excavated area around the tree root ball.

12. The method of claim 11 wherein the side plates are connected together by means of a top framework for compressing the root ball into the box structure and the step of uncoupling the side plates includes the step of removing the top framework.

13. The method of claim 11 wherein the pulling apparatus comprises a hydraulic ram having one end brace against an adjacent one of the side plates and a second end coupled to a cable attached to the bottom plate such that actuation of the ram operates to pull be bottom plate from beneath the tree root ball.

14. The method of claim 1 wherein the cutting blade is formed with a serrated leading edge.

15. The method of claim 1 wherein the pulling mechanism comprises a hydraulic ram and a wire cable assembly arranged such that the ram operates in a plane generally perpendicular to the direction of movement of the box structure.

16. The method of claim 1 wherein the bottom plate comprises at least first and second mating plates that are held in juxtaposition by the side plates.

17. The method of claim 16 wherein the bottom plates comprise steel plates of about one inch thickness.

18. A method for moving a tree having a bole diameter of between about 14 inches and about 30 inches, comprising:
defining a desired root ball size for the tree such that roots of the tree can be severed without significantly harming the tree;
creating a first excavated area along one side of the tree extending outwardly from a defined edge of the desired root ball on that side of the tree, the first excavated area having a size larger than the size of the root ball and having a predetermined depth equal to the desired depth of the root ball;
positioning a box structure in the first excavated area, the box structure having a bottom plate and at least three vertically extending side plate members attached to peripheral edges of the bottom plate so as to form an open sided box, the peripheral edge of the bottom plate at the open side of the box having a serrated cutting blade;
creating a second excavated area on a side of the tree opposite the first excavated area and outside the defined area of the root ball, the second excavated area being sized to accept a pulling mechanism having a pair of cable attachments for connection to the box structure;
positioning the pulling mechanism in the second excavated area and connecting the cable attachments to the box structure through a pair of trenches connecting the first and second excavated areas;
actuating the pulling mechanism to pull the box structure under the tree such that the cutting blade severs the roots under the tree and the box structure encompasses the root ball of the tree;
fastening a fourth side of the box structure to the base plate and to the adjacent sides of the box structure; and
connecting a lifting device to the box structure and raising the box structure along with the tree for transport to another location.

19. A method for moving trees comprising:
cutting trenches around the tree so as to define a generally rectangular root ball for the tree, the trenches being cut to a depth of about 40 inches;
creating a first excavated area along one side of the tree extending outwardly from a first trench along that side of the tree, the first excavated area having a size larger than the size of the area of the root ball defined by the trenches surrounding the tree and having a depth at least the depth of the trenches;
positioning a box structure in the first excavated area, the box structure having a bottom plate and at least three vertically extending side plate members attached to peripheral edges of the bottom plate, the peripheral edge of the bottom plate abutting the root ball having a cutting blade without a side member;
creating a second excavated area on a side of the tree opposite the first excavated area, the second excavated area being sized to accept a pulling mechanism having a pair of cable attachments for connection to the box structure;

positioning the pulling mechanism in the second excavated area and connecting the cable attachments to the box structure through a pair of trenches connecting the first and second excavated areas;

actuating the pulling mechanism to pull the box structure under the tree such that the cutting blade severs the roots under the tree and the box structure encompasses the root ball of the tree defined by the trenches;

fastening a fourth side of the box structure to the base plate and to the adjacent sides of the box structure; and connecting a lifting device to the box structure and raising the box structure along with the tree for transport to another location.

20. The method of claim 19 wherein the lifting device includes a top framework attached to the side plate members and a plurality of rigid sheet members held in compression against the root ball by the top framework.

\* \* \* \* \*